US012801750B2

(12) United States Patent
Raj et al.

(10) Patent No.: US 12,801,750 B2
(45) Date of Patent: Nov. 17, 2026

(54) GENERATING A MULTI-PLATFORM REMEDIATION INFRASTRUCTURE BASED ON INTELLIGENTLY FORECASTING AND CONFIGURING A REMEDIATION SCHEDULE

(71) Applicant: Bank of America Corporation, Charlotte, NC (US)

(72) Inventors: Narsing Raj, Hyderabad (IN); Aashish Chandrahas Vinherkar, Mumbai (IN); Kommu John Bilton, Secunderabad (IN); Siva Venkata Lakshmi Sai Kumar Devulapalli, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 945 days.

(21) Appl. No.: 17/962,756

(22) Filed: Oct. 10, 2022

(65) Prior Publication Data

US 2024/0119160 A1 Apr. 11, 2024

(51) Int. Cl.
*G06F 8/65* (2018.01)
*G06F 21/57* (2013.01)

(52) U.S. Cl.
CPC .............. *G06F 21/577* (2013.01); *G06F 8/65* (2013.01); *G06F 2221/034* (2013.01)

(58) Field of Classification Search
USPC ........................................................... 726/25
See application file for complete search history.

(56) References Cited

U.S. PATENT DOCUMENTS 7,000,247 B2 * 2/2006 Banzhof ............... G06F 21/577 726/4
10,021,138 B2 7/2018 Gill et al.
10,958,691 B2 3/2021 Purushothaman
11,201,891 B2 12/2021 Davis et al.
11,321,464 B2 5/2022 Govardhan
11,431,550 B2 8/2022 Zafer et al.
2019/0013033 A1 * 1/2019 Bhimanaik ........... G10L 19/018
2019/0073457 A1 * 3/2019 Jiang ........................ H04L 63/00
2019/0281082 A1 * 9/2019 Carmichael ........... G06F 21/577
2020/0351294 A1 * 11/2020 Davis .................. H04L 63/1433
2021/0043199 A1 * 2/2021 Liu ......................... G06F 21/32

* cited by examiner

*Primary Examiner* — Vivek Srivastava
*Assistant Examiner* — Hien V Doan
(74) *Attorney, Agent, or Firm* — Banner & Witcoff, Ltd.

(57) ABSTRACT

Aspects of the disclosure relate to generating a multi-platform remediation infrastructure based on intelligently forecasting and configuring a remediation schedule. The computing platform may continuously analyze components within the enterprise organization infrastructure to identify at least one vulnerability within the infrastructure. The computing platform may group the vulnerabilities based on identified similarities and may identify, for each group, a time during which each vulnerability may be remediated. The computing platform may use the times to generate a remediation schedule and may analyze the remediation schedule to determine whether the schedule comprises anomalies. Based on determining the remediation schedule does not comprise anomalies, the computing platform may remediate the vulnerabilities indicated on the remediation schedule. Alternatively, based on determining the remediation schedule comprises anomalies, the computing platform may further analyze the vulnerabilities to determine whether the vulnerabilities may be remediated.

17 Claims, 6 Drawing Sheets

GENERATING A MULTI-PLATFORM REMEDIATION INFRASTRUCTURE BASED ON INTELLIGENTLY FORECASTING AND CONFIGURING A REMEDIATION SCHEDULE

BACKGROUND

Aspects of the disclosure further relate to hardware and/or software for generating a multi-platform remediation infrastructure based on intelligently forecasting and configuring a remediation schedule. In particular, one or more aspects of the disclosure may further relate to monitoring components within an enterprise organization infrastructure, identifying vulnerabilities within the infrastructure, identifying a remediation time for each identified vulnerability, and generating a remediation schedule based on the remediation times.

Current procedures for maintaining enterprise organization infrastructures (e.g., enterprise organization network(s), database(s), operating system(s), hardware, software, or the like) permit enterprise organizations to identify vulnerabilities within each component of the infrastructure (e.g., a database software update, a network protection update, or the like) and to individually remediate each vulnerability. In some instances, the enterprise organization may internally remediate each vulnerability as it is identified. Further, in some instances, the enterprise organization may use at least one software patch (e.g., when made available by an external vendor, or the like), wherein the software patch may comprise a remediation solution to at least one vulnerability within the infrastructure. However, the enterprise organization might not survey and/or prioritize the totality of identified vulnerabilities prior to implementing a remediation solution and, consequently, may interrupt the functionality of the infrastructure. Therefore, current procedures for maintaining enterprise organization infrastructures might not afford enterprise organizations resources for grouping similar vulnerabilities, predicting a time during which the similar vulnerabilities can be remediated, and tracking anomalies within the vulnerabilities that may interrupt the functionality of the infrastructure during remediation.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with generating, in real-time or near real-time, a multi-platform remediation infrastructure based on intelligently forecasting and configuring a remediation schedule.

In accordance with one or more embodiments, a method may comprise, at a computing device including one or more processors and memory, analyzing a plurality of components within an enterprise organization infrastructure. The method may comprise identifying, based on the analysis, a plurality of vulnerabilities within the enterprise organization infrastructure, wherein each vulnerability corresponds to at least one component of the plurality of components. The method may comprise receiving at least one software patch comprising a remediation solution for at least one vulnerability associated with a component of the plurality of components. The method may comprise identifying similarities shared by the plurality of vulnerabilities. The method may comprise grouping vulnerabilities, of the plurality of vulnerabilities, based on the identified similarities. The method may comprise identifying, for each group, a time during which the vulnerabilities can be remediated. The method may comprise generating a remediation schedule comprising the vulnerabilities and the times. The method may comprise determining whether the remediation schedule comprises anomalies. The method may comprise, based on determining the remediation schedule does not comprise anomalies, remediating the vulnerabilities indicated in the remediation schedule at the time indicated.

In accordance with one or more embodiments, a computing platform may comprise at least one processor, a communication interface communicatively coupled to the at least one processor, and memory storing computer-readable instructions that, when executed by the at least one processor, cause the computing platform to analyze a plurality of components within an enterprise organization infrastructure. The computing platform may identify, based on the analysis, a plurality of vulnerabilities within the enterprise organization infrastructure, wherein each vulnerability corresponds to at least one component of the plurality of components. The computing platform may receive at least one software patch comprising a remediation solution for at least one vulnerability associated with a component of the plurality of components. The computing platform may identify similarities shared by the plurality of vulnerabilities. The computing platform may group vulnerabilities, of the plurality of vulnerabilities, based on the identified similarities. The computing platform may identify, for each group, a time during which the vulnerabilities can be remediated. The computing platform may generate a remediation schedule comprising the vulnerabilities and the times. The computing platform may determine whether the remediation schedule comprises anomalies. The computing platform may, based on determining the remediation schedule does not comprise anomalies, remediate the vulnerabilities indicated in the remediation schedule at the time indicated.

In accordance with one or more embodiments, one or more non-transitory computer-readable media storing instructions that, when executed by a computing platform comprising at least one processor, memory, and a communication interface, cause the computing platform to analyze a plurality of components within an enterprise organization infrastructure. The instructions, when executed, may cause the computing platform to identify, based on the analysis, a plurality of vulnerabilities within the enterprise organization infrastructure, wherein each vulnerability corresponds to at least one component of the plurality of components. The instructions, when executed, may cause the computing platform to receive at least one software patch comprising a remediation solution for at least one vulnerability associated with a component of the plurality of components. The instructions, when executed, may cause the computing platform to identify similarities shared by the plurality of vulnerabilities. The instructions, when executed, may cause the computing platform to group vulnerabilities, of the plurality of vulnerabilities, based on the identified similarities. The instructions, when executed, may cause the computing platform to identify, for each group, a time during which the vulnerabilities can be remediated. The instructions, when executed, may cause the computing platform to generate a remediation schedule comprising the vulnerabilities and the times. The instructions, when executed, may cause the computing platform to determine whether the remediation schedule comprises anomalies. The instructions, when executed, may cause the computing platform to, based on determining the remediation schedule does not comprise anomalies, remediate the vulnerabilities indicated in the remediation schedule at the time indicated.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1A:
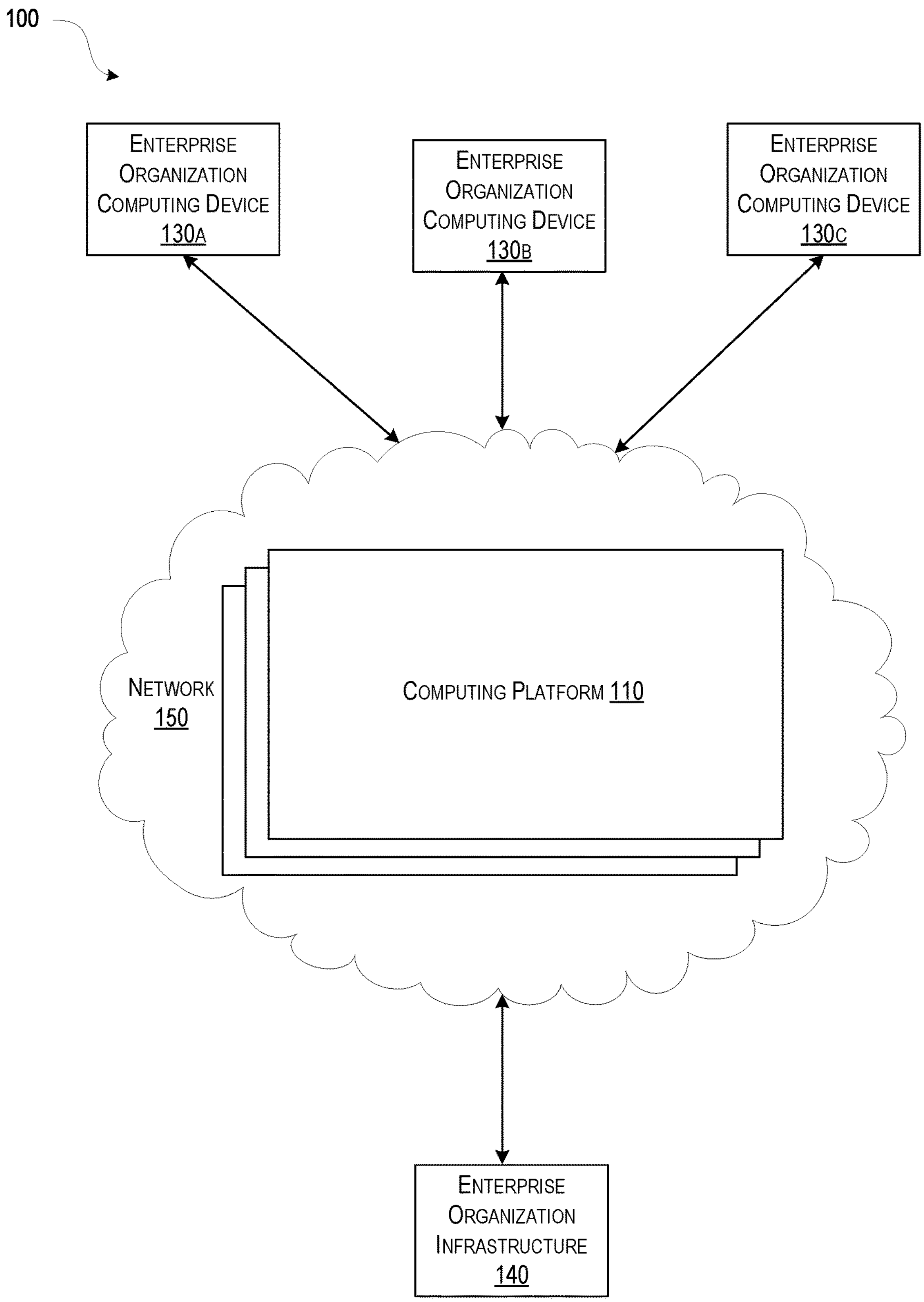
FIG. 1A depicts an illustrative example of a computer system for generating a multi-platform remediation infrastructure based on intelligently forecasting and configuring a remediation schedule, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current procedures for maintaining enterprise organization infrastructures might not afford enterprise organizations resources for grouping similar vulnerabilities, predicting a time during which the similar vulnerabilities can be remediated, and tracking anomalies within the vulnerabilities that may interrupt the functionality of the infrastructure during remediation. Accordingly, proposed herein is a solution to the problem described above that includes generating a multi-platform remediation infrastructure based on intelligently forecasting and configuring a remediation schedule. For example, a computing platform may continuously monitor a plurality of components within the enterprise organization infrastructure and may identify a plurality of vulnerabilities (e.g., software applications to be updated, hardware components to be replaced, or the like). The computing platform may parse the plurality of vulnerabilities and may generate a plurality of vulnerability groups based on identifying similarities between vulnerabilities (e.g., a first vulnerability group may comprise vulnerabilities corresponding to a first database, a second vulnerability group may comprise vulnerabilities corresponding to a first server, or the like). The computing platform may parse each vulnerability group to determine a time during which each vulnerability may be remediated (e.g., a time during which the first database might not be needed and during which the vulnerabilities corresponding to the first database may be remediated, or the like). The computing platform may generate a remediation schedule based on the times during which each vulnerability may be remediated. The computing platform may remediate the vulnerabilities as scheduled based on determining the remediation schedule might not contain anomalies. Alternatively, based on determining the remediation schedule contains at least one anomaly, the computing platform may determine the likelihood of success of each scheduled remediation, and may remediate the vulnerabilities based on the corresponding likelihood of success.

Computer Architecture

FIG. 1A depicts an illustrative example of a computer system 100 that may be used for generating, in real-time or near real-time, a multi-platform remediation infrastructure based on intelligently forecasting and configuring a remediation schedule, in accordance with one or more aspects described herein. Computer system 100 may comprise one or more computing devices including at least computing platform 110, enterprise organization computing devices 130*a*-130*c*, and enterprise organization infrastructure 140. While FIG. 1A depicts more than one enterprise organization computing device (e.g., enterprise organization computing devices 130*a*-130*c*), each of enterprise organization computing devices 130*a*-130*c* may be configured in accordance with the features described herein. While the description herein may refer to enterprise organization computing device 130, the functions described in connection with enterprise organization computing device 130 may also be performed by any one of enterprise organization computing devices 130*a*-130*c*. While FIG. 1A depicts enterprise organization computing devices 130*a*-130*c*, more or less than three enterprise organization computing devices may exist within computer system 100. Three enterprise organization computing devices are depicted in FIG. 1A for illustration purposes only and are not meant to be limiting.

Enterprise organization computing device 130 may instruct computing platform 110 to analyze each component of enterprise organization infrastructure 140 and to identify vulnerabilities associated with the components. Enterprise organization computing device 130 may receive, from at least one computing device within computing platform 110, a notification indicating completion of the remediation of the identified vulnerabilities (e.g., the vulnerabilities indicated on a remediation schedule, or the like). In some instances, enterprise organization computing device 130 may receive, from at least one computing device within computing platform 110, a notification indicating failure to remediate at least one vulnerability on the remediation schedule. The notification may also indicate at least one reason why the remediation failed.

Enterprise organization computing device 130 may interact with enterprise organization infrastructure 140 to conduct operations associated with the enterprise organization. Enterprise organization computing device 130 may receive data from agents within the enterprise organization and/or consumers associated with the enterprise organization, wherein the data may comprise a request for execution of at least one enterprise organization service and/or program. Enterprise organization computing device 130 may process the received request and may transmit a response to the at least one agent within the enterprise organization and/or the consumers associated with the enterprise organization.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with enterprise organization computing device 130, enterprise organization infrastructure 140, and/or additional computing devices.

Computing platform 110 may receive, from enterprise organization computing device 130, instructions to analyze components within enterprise organization infrastructure 140. Computing platform 110 may identify, based on the analysis, vulnerabilities associated with the components and may group the vulnerabilities based on determining similarities between the vulnerabilities. For each group, computing platform 110 may determine a time during which each vulnerability can be remediated and may generate a remediation schedule using the times. Computing platform 110 may analyze the remediation schedule and may, based on the analysis, remediate the vulnerabilities indicated on the remediation schedule. Computing platform 110 may transmit a notification to enterprise organization computing device 130 indicating completion of the remediations. Alternatively, computing platform 110 may transmit a notification to enterprise organization computing device 130 indicating failure to remediate at least one vulnerability.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in database 120 (shown in FIG. 1B), for data received from at least one of enterprise organization computing device 130 and/or enterprise organization infrastructure 140.

Enterprise organization computing device 130 and/or enterprise organization infrastructure 140 may be configured to interact with computing platform 110 through network 150. In some arrangements, computer system 100 may include additional computing devices and networks that are not depicted in FIG. 1A, which may also be configured to interact with computing platform 110. In some instances, at least one of enterprise organization computing device 130 and/or enterprise organization infrastructure 140 may be configured to receive and transmit information corresponding to requests through particular channels and/or applications associated with computing platform 110. The requests submitted by at least one of enterprise organization computing device 130 and/or enterprise organization infrastructure 140 may initiate the performance of particular computational functions at computing platform 110, such as the analysis of at least one component of enterprise organization infrastructure 140.

As stated above, computer system 100 also may include one or more networks, which may interconnect one or more of computing platform 110, enterprise organization computing device 130, and enterprise organization infrastructure 140. For example, centralized computer system 100 may include network 150. Network 150 may include one or more sub-networks (e.g., local area networks (LANs), wide area networks (WANs), or the like). Furthermore, computer system 100 may include a local network configured to interconnect each of the computing devices comprising computing platform 110.

Figure 1B:
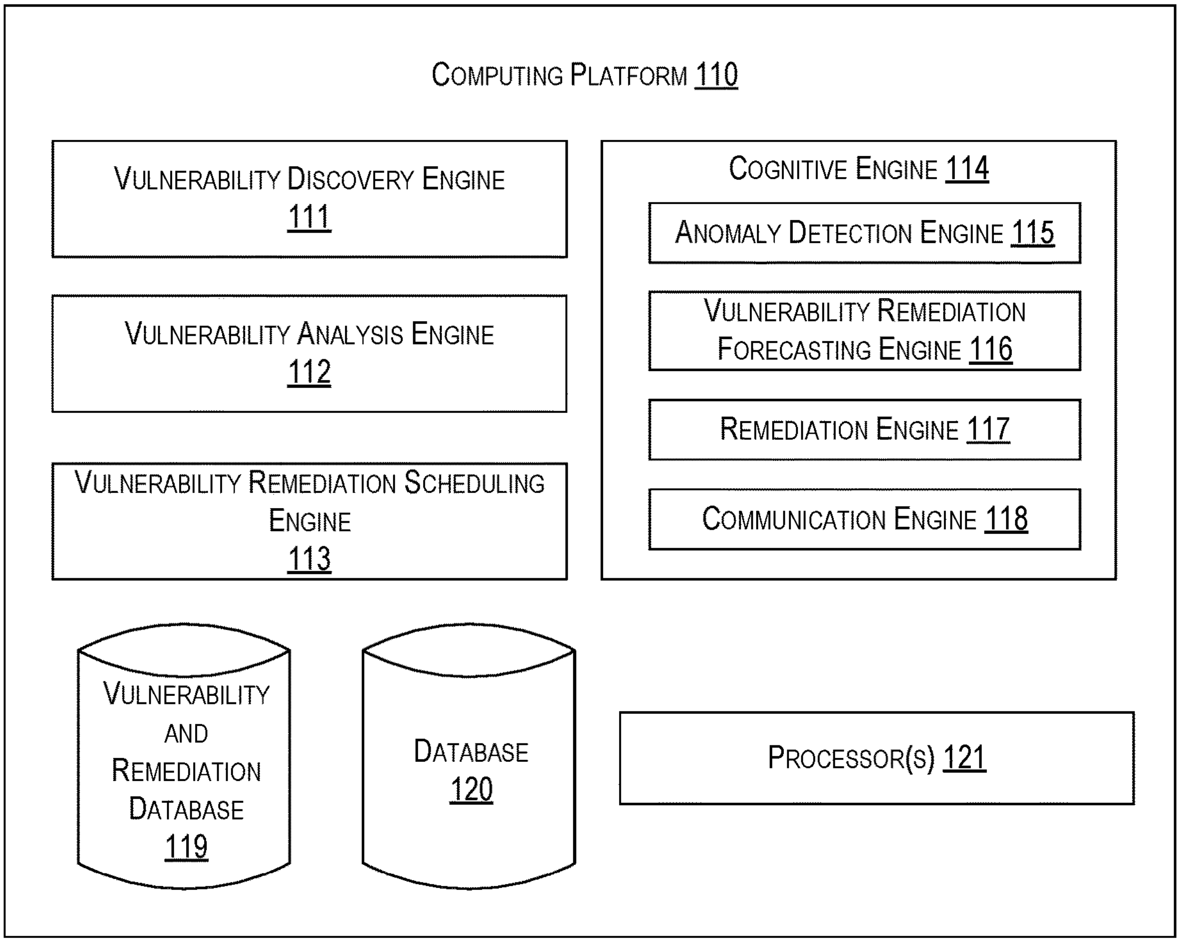
FIG. 1B depicts an illustrative example of the computing platform that may be used for generating a multi-platform remediation infrastructure based on intelligently forecasting and configuring a remediation schedule, in accordance with one or more example embodiments.

FIG. 1B depicts one example computing platform 110 that may be used for generating, in real-time or near real-time, a multi-platform remediation infrastructure based on intelligently forecasting and configuring a remediation schedule, in accordance with one or more aspects described herein. Computing platform 110 may use vulnerability discovery engine 111, vulnerability analysis engine 112, vulnerability remediation scheduling engine 113, cognitive engine 114, vulnerability and remediation database 119, database 120, and/or processor(s) 121 to analyze at least one component of enterprise organization infrastructure 140. Cognitive engine 114 may comprise anomaly detection engine 115, vulnerability remediation forecasting engine 116, remediation engine 117, and/or communication engine 118. Each computing device within computing platform 110 may contain database 120 and processor(s) 121, which may be stored in the memory of the one or more computing devices of computing platform 110. Through execution of computer-readable instructions stored in memory, the computing devices of computing platform 110 may be configured to perform functions of the centralized entity and store the data generated during the performance of such functions in database 120.

Vulnerability discovery engine 111 may analyze components within enterprise organization infrastructure 140 to identify vulnerabilities within the infrastructure (e.g., enterprise organization software that requires an update, an enterprise organization application that requires troubleshooting, or the like). Based on determining enterprise organization infrastructure 140 comprises at least one vulnerability, vulnerability discovery engine 111 may generate and transmit a vulnerability dataset to vulnerability analysis engine 112. Vulnerability discovery engine 111 may receive at least one software patch that resolves the at least one vulnerability. Vulnerability discovery engine 111 may generate at least one remediation command that may be used to remediate the at least one vulnerability.

Vulnerability analysis engine 112 may parse the vulnerability dataset to identify similarities between the vulnerabilities. Vulnerability analysis engine 112 may group the vulnerabilities based on the identified similarities and may transmit the groups to vulnerability remediation scheduling engine 113.

Vulnerability remediation scheduling engine 113 may parse each vulnerability within each group to identify a time at which the vulnerability may be remediated. Vulnerability remediation scheduling engine 113 may use the times to generate a remediation schedule and may transmit the remediation schedule to cognitive engine 114.

Anomaly detection engine 115, of cognitive engine 114, may parse the remediation schedule to determine whether the remediation schedule contains at least one anomaly that may interrupt the scheduled remediations and/or disrupt the functionality of enterprise organization infrastructure 140. Anomaly detection engine 115 may determine an anomaly score for each anomaly. If anomaly detection engine 115 determines an anomaly score is less than a threshold anomaly score, then anomaly detection engine 115 may instruct remediation engine 117 to remediate the corresponding vulnerability. Alternatively, if anomaly detection engine 115 determines the anomaly score is equal to or greater than the threshold anomaly score, then anomaly detection engine 115 may transmit the vulnerability and the corresponding anomaly score to vulnerability remediation forecasting engine 116.

Vulnerability remediation forecasting engine 116, of cognitive engine 114, may receive at least one anomaly and corresponding anomaly score from anomaly detection engine 115. Vulnerability remediation forecasting engine 116 may predict the likelihood of success of the remediation of each anomaly and may transmit the likelihood of success of each anomaly to remediation engine 117.

Remediation engine 117 may use the likelihood of success of each anomaly to determine whether to remediate the corresponding vulnerability. Remediation engine 117 may remediate the vulnerabilities using the at least one software patch received from vulnerability discovery engine 111 and/or using at least one remediation command retrieved from vulnerability and remediation database 119.

Communication engine 118 may monitor the remediation performed by remediation engine 117 and may generate a notification indicating completion of the remediations indicated on the remediation schedule. Communication engine 118 may transmit the notification to enterprise organization computing device 130 to indicate completion of the remediations. Alternatively, communication engine 118 may generate, based on the monitoring, a notification indicating failure to remediate at least one vulnerability indicated on the remediation schedule. Communication engine 118 may transmit the notification to enterprise organization computing device 130 to indicate the failure to remediate as well as at least one reason for the failed remediation.

Figure 1C:
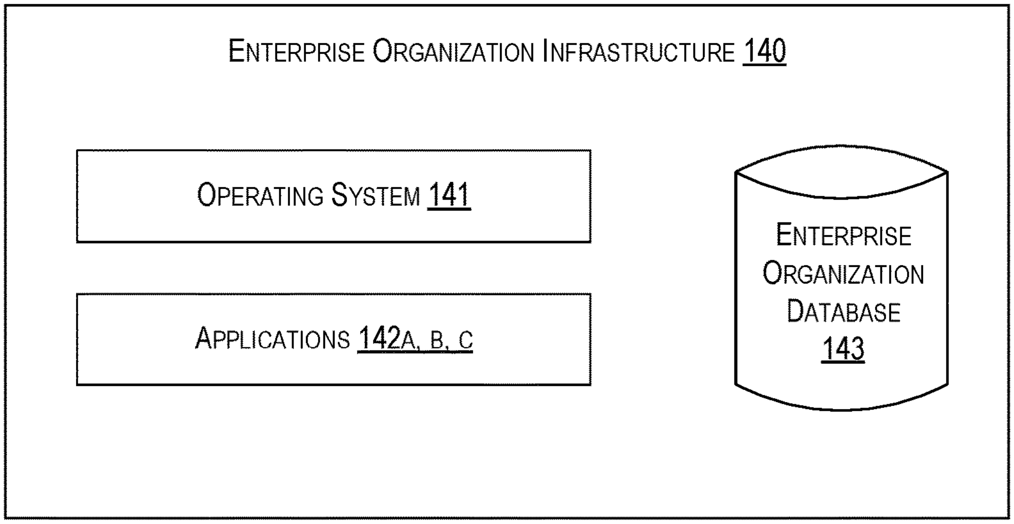
FIG. 1C depicts an illustrative example of the enterprise organization infrastructure that may be used for generating a multi-platform remediation infrastructure based on intelligently forecasting and configuring a remediation schedule, in accordance with one or more example embodiments.

FIG. 1C depicts one example enterprise organization infrastructure 140 that may be used for generating, in real-time or near real-time, a multi-platform remediation infrastructure based on intelligently forecasting and configuring a remediation schedule, in accordance with one or more aspects described herein. Enterprise organization infrastructure 140 may consist of at least operating system 141, applications 142*a*-142*c*, and/or enterprise organization database 143.

Operating system 141 may provide a framework within with the enterprise organization that may execute enterprise organization programs and/or enterprise organization operations. Enterprise organization computing devices 130*a*-130*c* and additional computing devices (not pictured in FIGS. 1A-1C) may run operating system 141. Operating system 141 may be configured to monitor and/or support software and hardware associated with each of enterprise organization computing devices 130*a*-130*c* and/or additional computing device. As such, operating system 141 may be configured to receive input from, and transmit information to, at least one peripheral device associated with enterprise organization computing devices 130*a*-130*c* and/or additional computing devices.

Applications 142*a*-142*c* may be used to execute enterprise organization programs and/or enterprise organization operations. Applications 142*a*-142*c* may be domain specific applications that may be configured to support specific operations of the enterprise organization. Applications 142*a*-142*c* may receive requests from, and transmit data to, enterprise organization computing devices 130*a*-130*c* (e.g., via at least one peripheral device associated with enterprise organization computing devices 130*a*-130*c*, or the like). While applications 142*a*-142*c* are illustrated in FIG. 1C, enterprise organization infrastructure 140 may comprise more or less than three applications.

Enterprise organization database 143 may comprise enterprise organization data that corresponds to at least one of enterprise organization operations, programs, applications 142*a*-142*c*, and/or computing devices associated with the enterprise organization (e.g., enterprise organization computing devices 130*a*-130*c* and/or additional computing devices, or the like). Access to enterprise organization database 143 may differ depending on the computing device that is requesting access (e.g., a hierarchy of accessibility). Enterprise organization computing device 130 may be associated with a first level of accessibility (e.g., a least restrictive level of accessibility). Enterprise organization computing device 130 may perform functions on the enterprise organization data stored within enterprise organization database 143 (e.g., access data, add data, remove data, modify data, or the like). The remaining computing devices within computer system 100 may be associated with a second level of accessibility (e.g., a more restrictive level of accessibility than the first level of accessibility). The remaining computing devices may access the enterprise organization data, but might not be permitted to add, remove, and/or modify the data within enterprise organization database 143.

Enterprise organization computing device 130 may run operating system 141 and may interact with applications 142*a*-142*c*. Enterprise organization computing device 130 may also store enterprise organization data within and/or retrieve enterprise organization data from enterprise organization database 143.

Figure 2A:
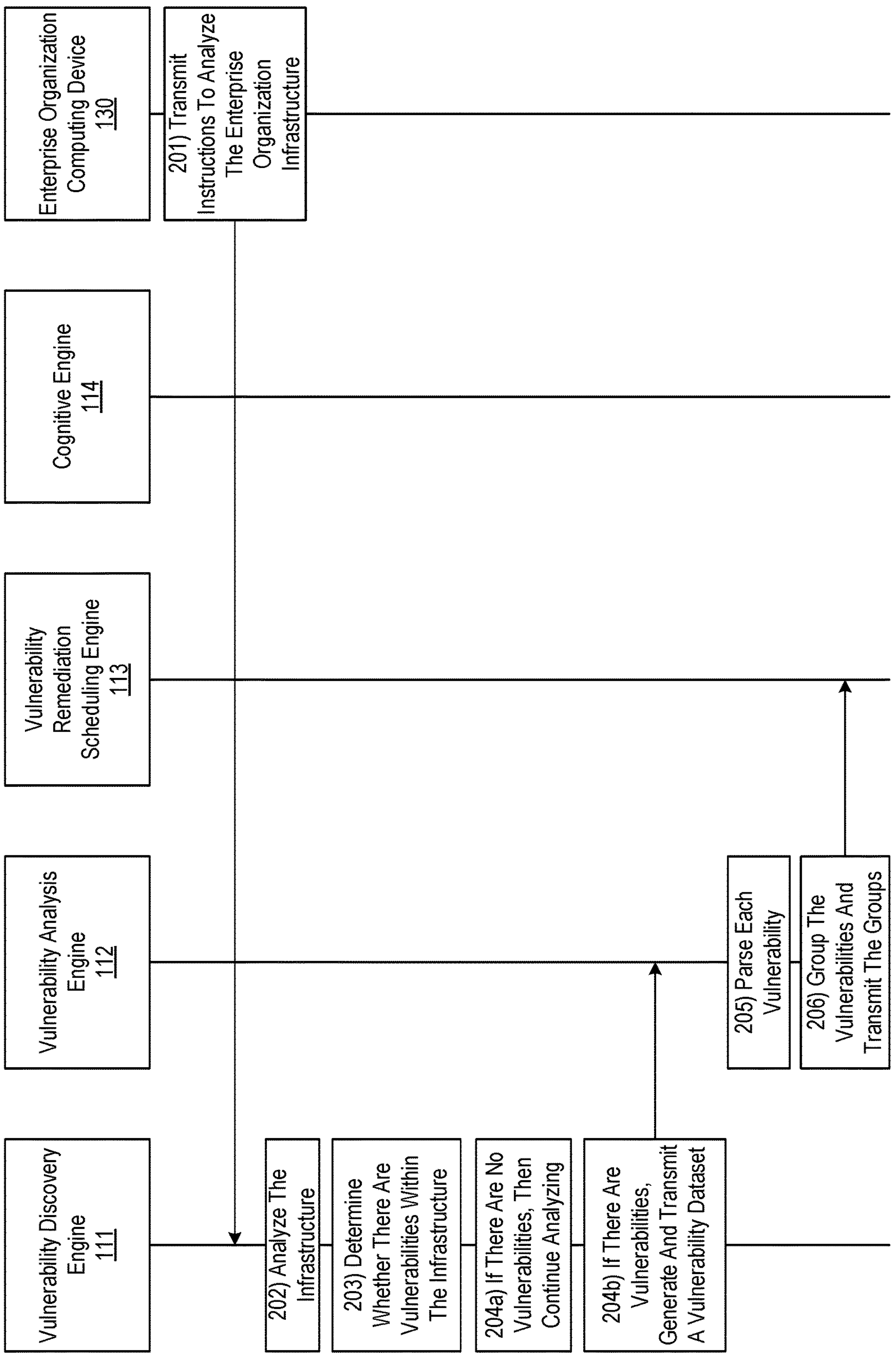
FIGS. 2A-2C depict an illustrative event sequence for generating a multi-platform remediation infrastructure based on intelligently forecasting and configuring a remediation schedule, in accordance with one or more example embodiments.
Figure 2B:
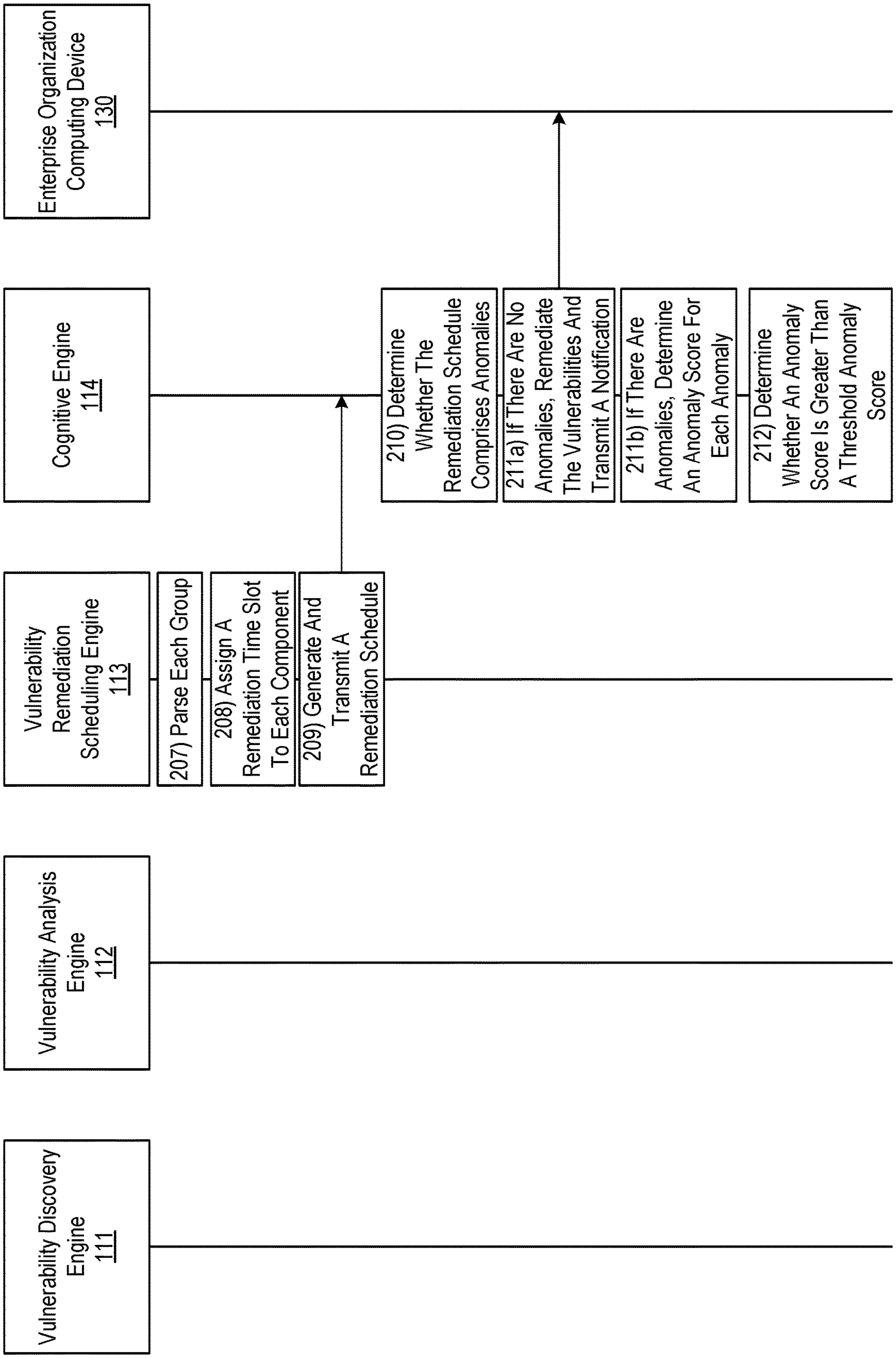
Figure 2C:
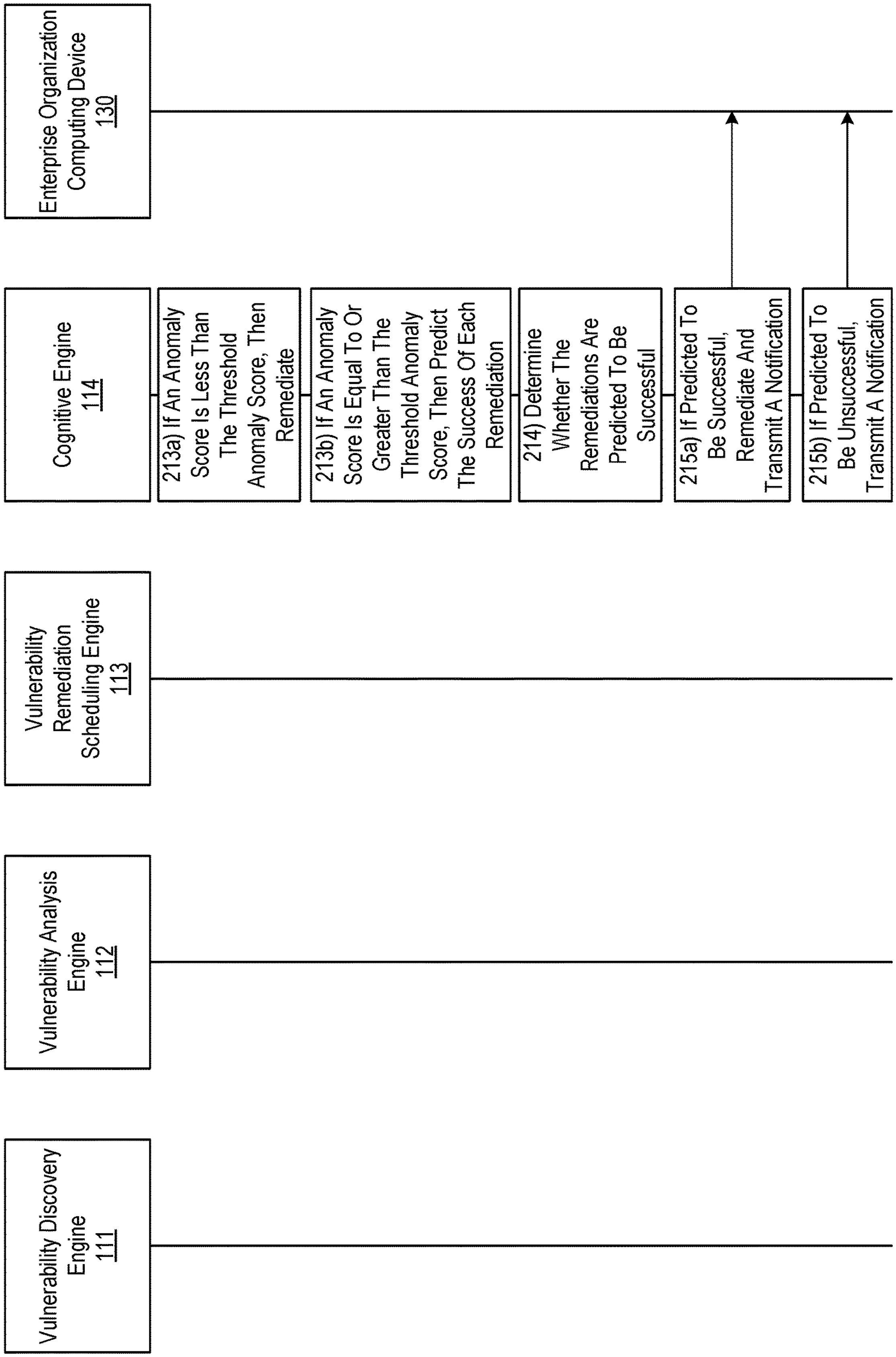

Generating a Multi-Platform Remediation Infrastructure Based on Intelligently Forecasting and Configuring a Remediation Schedule FIGS. 2A-2C depict an illustrative event sequence for generating, in real-time or near real-time, a multi-platform remediation infrastructure based on intelligently forecasting and configuring a remediation schedule, in accordance with one or more aspects described herein. While aspects described with respect to FIGS. 2A-2C may include the evaluation of a single enterprise organization infrastructure component (e.g., one of operating system 141, applications 142*a*-142*c*, enterprise organization database 143, or the like), a plurality of enterprise organization infrastructure components may be evaluated (e.g., in parallel) without departing from the present disclosure.

Referring to FIG. 2A, at step 201, enterprise organization computing device 130 may generate and transmit, to vulnerability discovery engine 111, instructions to analyze enterprise organization infrastructure 140 (e.g., analyze components within enterprise organization infrastructure 140, such as operating system 141, applications 142*a*-142*c*, enterprise organization database 143, or the like) and to identify vulnerabilities associated with the components within enterprise organization infrastructure 140. A vulnerability may identify at least one factor and/or reason why a component of enterprise organization infrastructure 140 might not function as expected (e.g., the operating system may require a software update, the database may require routine maintenance, or the like). If the vulnerability is not remediated, then the functionality of enterprise organization infrastructure 140 may be interrupted and, in some instances, the enterprise organization might not be able to execute enterprise organization operations and/or offer enterprise organization services.

Enterprise organization computing device 130 may transmit the instructions to vulnerability discovery engine 111 using at least one voice command. Enterprise organization computing device 130 may be configured to receive input from at least one peripheral device (e.g., a microphone, or the like). Enterprise organization computing device 130 may receive (e.g., from an enterprise organization agent, or the like) a voice command to analyze enterprise organization infrastructure 140 and/or a specific component of enterprise organization infrastructure 140. Enterprise organization computing device 130 may transmit the received voice command to vulnerability discovery engine 111.

In some instances, enterprise organization computing device 130 may transmit a notification to vulnerability discovery engine 111, wherein the notification may comprise instructions to continuously analyze enterprise organization infrastructure 140 (e.g., at predetermined time intervals, for a predetermined amount of time, based on a predetermined analysis schedule generated by enterprise organization computing device 130, or the like).

At step 202, vulnerability discovery engine 111 may receive the instructions from enterprise organization computing device 130 and may analyze enterprise organization infrastructure 140. In some instances, vulnerability discovery engine 111 may receive the instructions via a voice command from enterprise organization computing device 130. As such, vulnerability discovery engine 111 may use at least one natural language processing (NLP) algorithm to parse the voice command and may use at least one lexical analyzer to identify parts of speech within the voice command (e.g., identify an enterprise organization infrastructure component to be analyzed, identify at least one action to be taken in association with at least one component, or the like). Vulnerability discovery engine 111 may map the identified parts of speech to previously identified parts of speech (e.g., using a mapping catalogue, or the like).

The mapping catalogue may comprise previously processed instructions from enterprise organization computing device 130. The mapping catalogue may further comprise vulnerabilities that were identified in response to the previously received voice commands as well as remediation commands that were used to remediate each vulnerability. Vulnerability discovery engine 111 may use the mapped information to predict the vulnerabilities that may be found within enterprise organization infrastructure 140 and may initiate the analysis of enterprise organization infrastructure 140. In some instances, the voice command may describe the expected functionality of each (or a particular) component of enterprise organization infrastructure 140 (e.g., how features of each (or a particular) component should function for enterprise organization infrastructure 140 to perform successfully, or the like).

Additionally or alternatively, vulnerability discovery engine 111 may receive, from enterprise organization computing device 130, a notification comprising instructions to continuously analyze enterprise organization infrastructure 140 (e.g., for a predetermined amount of time, within a predetermined time frame, or the like). Vulnerability discovery engine 111 may parse the instructions, as described above, and may initiate the analysis of enterprise organization infrastructure 140 in accordance with the instructions. The instructions to continuously analyze enterprise organization infrastructure 140 may also describe the expected functionality of each (or a particular) component of enterprise organization infrastructure 140.

Vulnerability discovery engine 111 may observe each component of enterprise organization infrastructure 140 (e.g., operating system 141, applications 142*a*-142*c*, enterprise organization database 143, or the like) to determine whether the actual functionality of each component corresponds to (e.g., matches, is within a predetermined range of, or the like) the expected functionality of each component. Vulnerability discovery engine 111 may determine the expected functionality of the component based on the description of the expected functionality provided in the instructions from enterprise organization computing device 130.

At step 203, vulnerability discovery engine 111 may use the expected functionality of each component and the actual functionality of each component to determine whether there are vulnerabilities within enterprise organization infrastructure 140. To do so, vulnerability discovery engine 111 may identify features associated with each component of enterprise organization infrastructure 140 (e.g., operating system 141 may initialize each of enterprise organization computing devices 130*a*-130*c* upon startup, applications 142*a*-142*c* may handle different programs and/or services offered by the enterprise organization, or the like). Vulnerability discovery engine 111 may observe the actual functionality of each feature associated with each component of enterprise organization infrastructure 140 and may compare the actual functionality of each feature to the expected functionality of each feature.

If, at step 203, vulnerability discovery engine 111 determines that the actual functionality of each feature of each component corresponds to the expected functionality of each feature of each component, then, at step 204*a*, vulnerability discovery engine 111 may determine that enterprise organization infrastructure 140 might not contain vulnerabilities. As such, vulnerability discovery engine 111 may continue analyzing each component within enterprise organization infrastructure 140 (e.g., for the predetermined amount of time, until the end of the predetermine time frame, or the like). In some instances, vulnerability discovery engine 111 may terminate the analysis of enterprise organization infrastructure 140 based on determining enterprise organization infrastructure 140 might not contain vulnerabilities.

Alternatively, if, at step 203, vulnerability discovery engine 111 determines that the actual functionality of at least one feature of a component might not correspond to the expected functionality of the at least one feature of the component, then, at step 204*b*, vulnerability discovery engine 111 may determine that there is at least one vulnerability within enterprise organization infrastructure 140. Vulnerability discovery engine 111 may use the comparison to identify the vulnerabilities and may generate a vulnerability dataset that indicates each identified vulnerability within enterprise organization infrastructure 140. Vulnerability discovery engine 111 may store the vulnerability dataset within vulnerability and remediation database 119 and may transmit a copy of the vulnerability dataset to vulnerability analysis engine 112.

In some instances, vulnerability discovery engine 111 may generate at least one remediation solution for each vulnerability indicated in the vulnerability dataset. To do so, vulnerability discovery engine 111 may parse the mapping catalogue to determine whether at least one previously received instruction may be similar to the current instruction received from enterprise organization computing device 130. If vulnerability discovery engine 111 determines that at least one previously received instruction is similar to the current instruction, then vulnerability discovery engine 111 may locate and flag, within the mapping catalogue, the vulnerabilities that were identified in response to the previously received, similar instruction as well as the remediation commands that may have been generated to remediate the vulnerabilities. Vulnerability discovery engine 111 may modify the retrieved remediation commands such that the modified remediation commands address the identified vulnerabilities within the vulnerability dataset.

Additionally or alternatively, vulnerability discovery engine 111 may receive, from a plurality of vendors, at least one software patch that may be used to remediate at least one vulnerability within enterprise organization infrastructure 140 (e.g., a software update that may be needed to maintain the functionality of enterprise organization infrastructure 140, or the like). Vulnerability discovery engine 111 may store the received software patches (e.g., within a binary store, or the like) and may generate (e.g., using an interpreter, or the like) remediation commands to remediate the vulnerabilities using the at least one software patch and, in some instances, the remediation commands retrieved from the mapping catalogue.

Vulnerability discovery engine 111 may store, within vulnerability and remediation database 119, the retrieved remediations commands, the modified remediation commands, the remediation commands generated using at least one software patch, the vulnerability dataset, and/or data from the mapping catalogue indicating previously identified vulnerabilities that may be similar to the current vulnerabilities. Vulnerability and remediation database 119 may further contain data that describes each component of enterprise organization infrastructure 140 (e.g., a remediation history of each component, scheduled remediations for each component, remediation issues the components previously experienced, or the like).

Access to vulnerability and remediation database 119 may depend on the computing device requesting access (e.g., a hierarchy of accessibility, or the like). Vulnerability discovery engine 111 and remediation engine 117 may be associated with a first level of accessibility (e.g., a least restrictive level of accessibility). As such, vulnerability discovery engine 111 and remediation engine 117 may be authorized to perform functions on the data within vulnerability and remediation database 119 (e.g., access the data, add data, remove data, modify the data, or the like). The remaining computing devices may be associated with a second level of accessibility (e.g., a more restrictive level of accessibility that the first level of accessibility). The remaining computing devices may be configured to view the data, but might not be able to add, remove, and/or modify the data.

At step 205, vulnerability analysis engine 112 may receive the vulnerability dataset from vulnerability discovery engine 111 and may parse each vulnerability indicated within the vulnerability dataset. For each vulnerability within the vulnerability dataset, vulnerability analysis engine 112 may identify at least one component of enterprise organization infrastructure 140 that corresponds to the vulnerability (e.g., where the vulnerability is a database error, vulnerability analysis engine 112 may determine that the vulnerability corresponds to enterprise organization database 143, or the like). In some instances, enterprise organization infrastructure 140 may comprise a plurality of components of the same type (e.g., applications 142*a*-142*c*, or the like), wherein each component may correspond to a different enterprise organization operation and/or program. As such, when identifying the at least one component that corresponds to the vulnerability, vulnerability analysis engine 112 may pinpoint at least one component of the plurality of components (e.g., at least one of application 142*a*, 142*b*, and/or 142*c*, or the like). Vulnerability analysis engine 112 may also identify at least one feature of the component that corresponds to the vulnerability (e.g., where the vulnerability indicates a failure to update the financial history of the enterprise organization, the corresponding feature may indicate that financial application 142*a* automatically updates each month, where the vulnerability indicates a failure to organize information within a database, the corresponding feature may indicate that enterprise organization database 143 automatically executes maintenance updates each month, or the like).

At step 206, vulnerability analysis engine 112 may group the vulnerabilities within the vulnerability dataset using the at least one identified feature and using at least one data clustering algorithm (e.g., a K-Means clustering algorithm, a Mean-Shift algorithm, or the like). Vulnerability analysis engine 112 may determine a number of components of enterprise organization infrastructure 140 that are associated with at least one vulnerability. Vulnerability analysis engine 112 may use the number of components to determine a number of data clusters that may be generated. Vulnerability analysis engine 112 may determine a value associated with each component of enterprise organization infrastructure 140 that may be associated with at least one vulnerability (e.g., based on predetermined mapping values generated by the enterprise organization, based on weighted component values, or the like). Vulnerability analysis engine 112 may also determine a value associated with each vulnerability indicated in the vulnerability dataset (e.g., based on weighted vulnerability values determined by the enterprise organization, based on weighted values assigned to each feature of each component, or the like).

Vulnerability analysis engine 112 may use the component values and the vulnerability values to generate a graphical representation of the vulnerability dataset. Vulnerability analysis engine 112 may use the vulnerability values to determine each vulnerability's distance from each component (e.g., from each plotted component value, or the like). The distance between a plotted component value and a plotted vulnerability value may indicate whether the vulnerability is associated with the component (e.g., whether the vulnerability corresponds to a feature of component such that remediation of the feature also contributes to remediation of the component, or the like). The distance between a plotted component value and a plotted vulnerability value may be compared to a threshold distance. The threshold distance may indicate a maximum distance (e.g., determined by the enterprise organization, or the like) between the plotted component value and the plotted vulnerability value that may indicate that the vulnerability is associated with the component (e.g., the furthest distance that may exist between the plotted vulnerability value and the plotted component value for the vulnerability to be considered a feature of the component, or the like).

If vulnerability analysis engine 112 determines that the distance between the plotted component value and the plotted vulnerability value is equal to or less than the threshold distance, then vulnerability analysis engine 112 may determine that the vulnerability is associated with the component. Alternatively, if vulnerability analysis engine 112 determines that the distance between the plotted component value and the plotted vulnerability value is greater than the threshold distance, then vulnerability analysis engine 112 may determine that the vulnerability is not associated with the component. Vulnerability analysis engine 112 may continuously compare the distance between the plotted component value and the plotted vulnerability value (e.g., for a determined amount of time, until each vulnerability is associated with a component, or the like). In some instances, vulnerability analysis engine 112 may compare the distance between the plotted component value and the plotted vulnerability value to a modified threshold distance (e.g., a threshold distance modified by the enterprise organization based on predetermined factors, or the like).

In some instances, vulnerability analysis engine 112 may parse each vulnerability within the vulnerability dataset to identify similarities between the vulnerabilities. A similarity between at least two vulnerabilities may indicate that the vulnerabilities correspond to the same component, that the vulnerabilities correspond to the same feature of the component, or the like. Vulnerability analysis engine 112 may determine that vulnerabilities that share similarities, and/or correspond to the same component, may be remediated in parallel (e.g., at the same time, within a predetermined time frame, or the like) to reduce the likelihood of performing multiple remediations upon the component at different times.

Vulnerability analysis engine 112 may generate a plurality of groups of vulnerabilities based on the continued comparison and further based on determining similarities between the features associated with each component. Each group may comprise vulnerabilities that may correspond to the same component, vulnerabilities that may share similar features, or the like. Vulnerability analysis engine 112 may transmit the plurality of groups to vulnerability remediation scheduling engine 113.

Referring to FIG. 2B and at step 207, vulnerability remediation scheduling engine 113 may receive the plurality of groups and may parse the vulnerabilities within each group. Vulnerability remediation scheduling engine 113 may identify each component of enterprise organization infrastructure 140 to be remediated as well as particular features of each component to be remediated (e.g., particular application updates, database updates, operating system updates, or the like). Vulnerability remediation scheduling engine 113 may identify a time during which each component, and each vulnerability associated with each component, may be remediated. To do so, vulnerability remediation scheduling engine 113 may retrieve, from vulnerability and remediation database 119, the data that describes each component of enterprise organization infrastructure 140 (e.g., the remediation history of each component, scheduled remediations for each component, remediation issues the components previously experienced, or the like).

At step 208, vulnerability remediation scheduling engine 113 may use the retrieved data and at least one data classification algorithm (e.g., a Random Forest Decision Classification algorithm, a logical regression algorithm, or the like) to identify a time frame (e.g., between 00:00 am and 23:59 pm, or the like) during which each component, and corresponding vulnerabilities, may be remediated. In some instances, vulnerability remediation scheduling engine 113 may generate a decision tree, wherein the root node may correspond to the component to be remediated and the first level of branches may correspond to vulnerabilities associated with the component. Subsequent levels of branches may correspond to potential time frames during which the vulnerability may be remediated (e.g., a first leaf node may correspond to the 00:00 to 11:59 time frame and a second time frame may correspond to the 12:00 to 23:59 time frame, or the like). To elect a time frame during which each vulnerability may be remediated, vulnerability remediation scheduling engine 113 may consider factors such as times at which each vulnerability was previously remediated, whether the component associated with the vulnerability may be scheduled for an upcoming remediation, whether there are times where inability to access the component may hinder the functionality of enterprise organization infrastructure 140, and/or the like. Vulnerability remediation scheduling engine 113 may elect a time frame from a first level of leaf nodes (e.g., may elect one of the first leaf node or the second leaf node, or the like), and may repeat the process herein on leaf nodes that may spawn from the elected leaf node.

Vulnerability remediation scheduling engine 113 may continuously reduce the elected time frame to further narrow the time frame within which the vulnerability may be remediated (e.g., if the first leaf node is elected, then a third leaf node may correspond to the 00:00 to 05:59 time frame and a fourth leaf node may correspond to the 06:00 to 11:59 time frame, or the like). Vulnerability remediation scheduling engine 113 may repeat the process described herein for each vulnerability associated with the component identified in the root node. Vulnerability remediation scheduling engine 113 may analyze the remediation time elected for each vulnerability within the decision tree and may determine whether there may be conflict between the elected times (e.g., determine whether the elected remediation time of a first vulnerability may complicate the remediation of a second vulnerability, determine whether the elected remediation times associated with a first component may complicate the remediation of a second component, determine whether the elected remediation times challenge the functionality of enterprise organization infrastructure 140, or the like).

In some instances, vulnerability remediation scheduling engine 113 may determine that the elected remediation times might not interrupt the remediation of other vulnerabilities, the remediation of other components, and/or the overall functionality of enterprise organization infrastructure 140. Alternatively, vulnerability remediation scheduling engine 113 may determine that at least one elected remediation time may interfere with at least one of the remediation of other vulnerabilities, the remediation of other components, and/or the overall functionality of enterprise organization infrastructure 140. As such, vulnerability remediation scheduling engine 113 may analyze the decision tree and identify at least one alternative remediation time. In some instances, vulnerability remediation scheduling engine 113 may transmit, to enterprise organization computing device 130, a notification requesting manual intervention for determining a remediation time for at least one vulnerability and/or component.

At step 209, vulnerability remediation scheduling engine 113 may generate a remediation schedule. The remediation schedule may indicate each vulnerability to be remediated as well as the corresponding time frame within which each vulnerability may be remediated. Vulnerability remediation scheduling engine 113 may transmit the remediation schedule to cognitive engine 114.

At step 210, anomaly detection engine 115, of cognitive engine 114, may parse the remediation schedule to determine whether the remediation schedule comprises at least one anomaly. An anomaly may indicate a scenario that may interrupt the remediation of the vulnerabilities listed on the remediation schedule (e.g., financial application 142*a* might not be remediated if suspension of the functionality of financial application 142*a* interrupts a financial institution's ability to process financial transactions e.g., during business hours, or the like). To determine whether the remediation schedule comprises at least one anomaly, anomaly detection engine 115 may use at least one machine learning algorithm (e.g., K-nearest neighbor algorithm, or the like) to generate clusters of vulnerabilities.

Anomaly detection engine 115 may determine a value associated with each vulnerability indicated on the remediation schedule (e.g., based on weighted vulnerability values determined by the enterprise organization, based on weighted values assigned to each feature of each component, or the like). Anomaly detection engine 115 may generate a graphical representation of the vulnerabilities indicated on the remediation schedule (e.g., may plot the vulnerabilities, or the like). Anomaly detection engine 115 may identify at least one cluster of vulnerabilities, wherein the cluster indicates a location where a majority of vulnerabilities associated with a component may be gathered. In some instances, the graphical representation of the vulnerabilities may comprise more than one cluster of vulnerabilities (e.g., the vulnerabilities associated with different components may generate a plurality of clusters such that each cluster of vulnerabilities corresponds to a component, or the like).

Anomaly detection engine 115 may generate at least one boundary, wherein each boundary may surround an identified cluster of vulnerabilities. Anomaly detection engine 115 may identify anomalies based on the location of each vulnerability within the graphical representation. Anomaly detection engine 115 may determine that the vulnerabilities that are outside of the boundaries may be anomalies.

If, at step 210, anomaly detection engine 115 determines that the remediation schedule might not comprise anomalies (e.g., all vulnerabilities may be within a boundary, or the like), then, at step 211*a*, remediation engine 117, of cognitive engine 114, may remediate the vulnerabilities (e.g., according to the remediation schedule, or the like). To do so, remediation engine 117 may retrieve, from vulnerability and remediation database 119, commands that may be used to remediate the vulnerabilities (e.g., commands that were previously used to remediate similar vulnerabilities, previously used commands that were modified to address the vulnerabilities indicated on the remediation schedule, remediation commands that were generated using at least one software patch, the at least one software patch, or the like). Remediation engine 117 may parse the retrieved commands and software patches to identify at least one command and/or software patch that may remediate the vulnerabilities scheduled for remediation. Remediation engine 117 may execute the identified commands and/or software patches to remediate the vulnerabilities. Remediation engine 117 may store, within vulnerability and remediation database 119, data that describes each remediation (e.g., the vulnerability that was remediated, the time that the remediation was executed, the at least one command and/or software patch that was used to remediate the vulnerability, or the like).

Communication engine 118, of cognitive engine 114, may monitor the remediation of each vulnerability indicated on the remediation schedule. Communication engine 118 may generate a notification (e.g., upon the completion of each scheduled remediation, or the like) indicating that vulnerabilities within enterprise organization infrastructure 140 were identified and remediated, and may transmit the notification to enterprise organization computing device 130. In some instances, the notification may describe each identified vulnerability and/or the at least one command and/or software patch that was executed to remediate the vulnerability (e.g., using data within vulnerability and remediation database 119, or the like).

Alternatively, if at step 210, anomaly detection engine 115 determines that the remediation schedule comprises at least one anomaly (e.g., at least one vulnerability is outside of the boundary surrounding the component with which the vulnerability is associated, or the like), then, at step 211*b*, vulnerability remediation forecasting engine 116, of cognitive engine 114, may parse the anomaly and determine a corresponding anomaly score. To determine the anomaly score, vulnerability remediation forecasting engine 116 may determine a distance between the anomaly and the boundary surrounding the component with which the vulnerability may be associated. Vulnerability remediation forecasting engine 116 may use at least one data classification algorithm (e.g., an XG Boosting algorithm, or the like) to apply a weighted value (e.g., determined by the enterprise organization, or the like) to the distance between the anomaly and the boundary to determine the anomaly score.

Vulnerability remediation forecasting engine 116 may also use the at least one data classification algorithm to analyze the determined anomaly score. The at least one data classification algorithm may receive (e.g., as input, training data, or the like) a threshold anomaly score (e.g., determined by the enterprise organization, or the like). The threshold anomaly score may indicate a maximum anomaly score that a vulnerability may be associated with and still undergo remediation (e.g., a maximum anomaly score that may indicate that remediation of the vulnerability might not interrupt the functionality of enterprise organization infrastructure 140, or the like). At step 212, vulnerability remediation forecasting engine 116 may compare each anomaly score to the threshold anomaly score (e.g., using the at least one data classification algorithm, or the like) to determine whether the vulnerability that corresponds to each anomaly may be remediated.

If, at step 212, vulnerability remediation forecasting engine 116 determines that the anomaly score may be less than the threshold anomaly score, then, referring to FIG. 2C and at step 213*a*, vulnerability remediation forecasting engine 116 may determine that the vulnerability that corresponds to anomaly may be remediated. As such, remediation engine 117 may retrieve, from vulnerability and remediation engine 119, commands and/or software patches that may be used to remediate the anomalies. Remediation engine 117 may parse the retrieved commands and/or software patches to identify at least one command and/or software patch that may remediate the anomalies. Remediation engine 117 may execute the identified commands and/or software patches to remediate the anomalies. Remediation engine 117 may store, within vulnerability and remediation database 119, data that describes each remediation (e.g., the anomaly (e.g., vulnerability, or the like) that was remediated, the time that the remediation was executed, at least one command and/or software patch that was used to remediate the anomaly, or the like).

Communication engine 118 may monitor the remediation of each anomaly and may generate a notification indicating that anomalies have been identified and remediated. Communication engine 118 may transmit the notification to enterprise organization computing device 130. In some instances, the notification may describe each identified anomaly, the corresponding vulnerability, and/or the at least one command and/or software patch that may have been executed during remediation.

Alternatively, if, at step 212, vulnerability remediation forecasting engine 116 determines that the anomaly score may be equal to or greater than the threshold anomaly score, then, at step 213*b*, vulnerability remediation forecasting engine 116 may predict the success of the remediation of the vulnerability that corresponds to the anomaly. To do so, vulnerability remediation forecasting engine 116 may use the at least one data classification algorithm and training data (e.g., previously analyzed anomalies and the corresponding vulnerabilities, previously determined anomaly scores, possible scenarios indicating the functionality of enterprise organization infrastructure 140 if the anomaly is remediated, possible scenarios indicating the functionality of enterprise organization infrastructure 140 if the anomaly is not remediated, or the like).

At step 214, vulnerability remediation forecasting engine 116 may predict the success of the remediation of each anomaly based on analyzing a plurality of scenarios that may impact the functionality of enterprise organization infrastructure 140. Vulnerability remediation forecasting engine 116 may use the predictions to determine whether to remediate the vulnerability that corresponds to the anomaly.

If, at step 214, vulnerability remediation forecasting engine 116 predicts that the remediation of the vulnerability that corresponds to the anomaly may be successful, then, at step 215*a*, vulnerability remediation forecasting engine 116 may indicate that the vulnerability associated with the anomaly may be remediated. As such, remediation engine 117 may retrieve, from vulnerability and remediation engine 119, commands and/or software patches that may be used to remediate the anomaly. Remediation engine 117 may parse the retrieved commands and/or software patches to identify at least one command and/or software patch that may remediate the anomaly. Remediation engine 117 may execute the identified commands and/or software patches to remediate the anomaly. Remediation engine 117 may store, within vulnerability and remediation database 119, data that describes each remediation.

Communication engine 118 may monitor the remediation of each anomaly and may generate a notification indicating that anomalies have been identified and remediated. Communication engine 118 may transmit the notification to enterprise organization computing device 130. In some instances, the notification may describe each identified anomaly, the corresponding vulnerability, and/or the at least one command and/or software patch that may have been executed during remediation.

Alternatively, if, at step 214, vulnerability remediation forecasting engine 116 predicts that the remediation of the vulnerability that corresponds to the anomaly may be unsuccessful, then, at step 215*b*, vulnerability remediation forecasting engine 116 may indicate that the vulnerability associated with the anomaly might not be remediated. Vulnerability remediation forecasting engine 116 may remove, from the remediation schedule, the vulnerability associated with the anomaly. Communication engine 118 may generate a notification indicating that the vulnerability associated with the anomaly might not be remediated and may transmit the notification to enterprise organization computing device 130. In some instances, the notification may describe why the remediation of the vulnerability associated with the anomaly might not be successful (e.g., based on determining the remediation of the vulnerability associated with the anomaly may disrupt the functionality of enterprise organization infrastructure 140, or the like).

Figure 3:
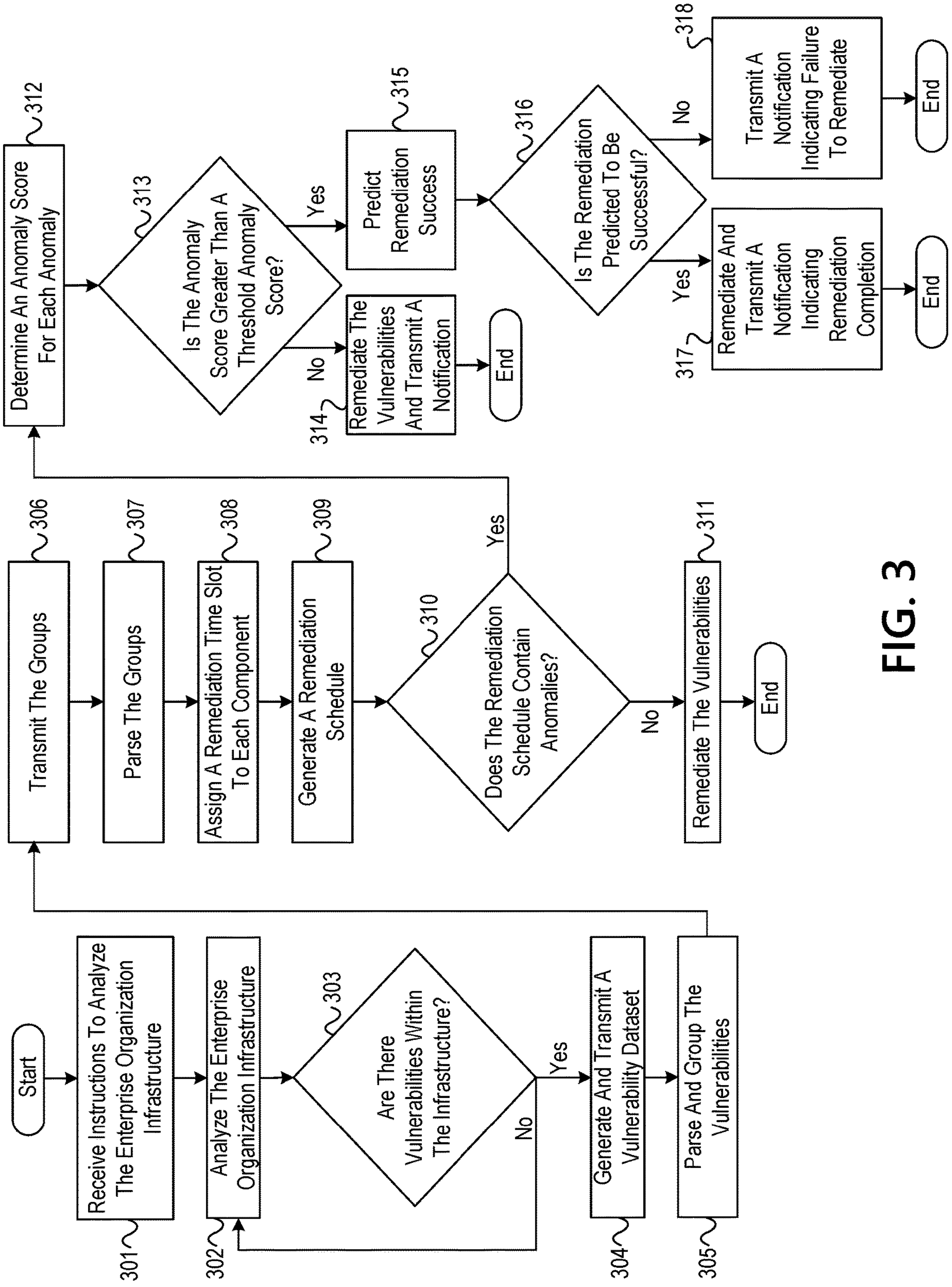
FIG. 3 depicts an illustrative method for generating a multi-platform remediation infrastructure based on intelligently forecasting and configuring a remediation schedule, in accordance with one or more example embodiments.

FIG. 3 depicts an illustrative event sequence for generating, in real-time or near real-time, a multi-platform remediation infrastructure based on intelligently forecasting and configuring a remediation schedule, in accordance with one or more aspects described herein. While aspects described with respect to FIG. 3 may include the evaluation of a single component of enterprise organization infrastructure 140, a plurality of components may be evaluated (e.g., in parallel) without departing from the present disclosure. The steps shown may be performed in the order shown, in a different order, more steps may be added, or one or more steps may be omitted, without departing from the disclosure. In some examples, one or more steps may be performed simultaneously with other steps shown and described. One or more steps shown in FIG. 3 may be performed in real-time or near real-time.

At step 301, vulnerability discovery engine 111 may receive, from enterprise organization computing device 130, instructions to analyze enterprise organization infrastructure 140 and to identify vulnerabilities associated with the components within enterprise organization infrastructure 140. The instructions may also describe the expected functionality of each (or a particular) component of enterprise organization infrastructure 140.

At step 302, vulnerability discovery engine 111 may receive the instructions from enterprise organization computing device 130 and may analyze enterprise organization infrastructure 140. Vulnerability discovery engine 111 may observe each component of enterprise organization infrastructure 140 to determine whether the actual functionality of each component corresponds to (e.g., matches, is within a predetermined range of, or the like) the expected functionality of each component. Vulnerability discovery engine 111 may use the comparison of the expected functionality of each component and the actual functionality of each component to determine whether there are vulnerabilities within enterprise organization infrastructure 140.

In some instances, vulnerability discovery engine 111 may identify features associated with each component of enterprise organization infrastructure 140. Vulnerability discovery engine 111 may observe the actual functionality of each feature associated with each component of enterprise organization infrastructure 140 and may compare the actual functionality of each feature to the expected functionality of each feature.

At step 303, vulnerability discovery engine 111 may determine, based on the comparison, whether there are vulnerabilities within enterprise organization infrastructure 140. If, at step 303, vulnerability discovery engine 111 determines that the actual functionality of each component corresponds to the expected functionality of each component, then vulnerability discovery engine 111 may determine that enterprise organization infrastructure 140 might not contain vulnerabilities. As such, vulnerability discovery engine 111 may continue analyzing each component within enterprise organization infrastructure 140 (e.g., for the predetermined amount of time, until the end of the predetermine time frame, or the like). In some instances, vulnerability discovery engine 111 may terminate the analysis of enterprise organization infrastructure 140 based on determining enterprise organization infrastructure 140 might not contain vulnerabilities.

Alternatively, if, at step 303, vulnerability discovery engine 111 determines that the actual functionality of at least one component might not correspond to the expected functionality of the component, then, at step 304, vulnerability discovery engine 111 may determine that there is at least one vulnerability within enterprise organization infrastructure 140. Vulnerability discovery engine 111 may use the comparison to identify the vulnerabilities and may generate a vulnerability dataset that indicates each identified vulnerability. Vulnerability discovery engine 111 may store the vulnerability dataset within vulnerability and remediation database 119 and may transmit a copy of the vulnerability dataset to vulnerability analysis engine 112.

Vulnerability discovery engine 111 may generate at least one remediation solution for each vulnerability indicated in the vulnerability dataset (e.g., based on previously received instructions that may be similar to the current instruction, remediation commands that may have been used to remediate previously identified vulnerabilities, at least one software patch that may comprise a remediation solution, or the like). Vulnerability discovery engine 111 may store, within vulnerability and remediation database 119, the remediations commands, the at least one software patch, the vulnerability dataset, and/or data indicating previously identified vulnerabilities that may be similar to the current vulnerabilities.

At step 305, vulnerability analysis engine 112 may receive the vulnerability dataset from vulnerability discovery engine 111 and may parse each vulnerability indicated within the vulnerability dataset. Vulnerability analysis engine 112 may group the vulnerabilities within the vulnerability dataset using at least one data clustering algorithm (e.g., a K-Means clustering algorithm, a Mean-Shift algorithm, or the like) and based on identifying similarities between the vulnerabilities.

At step 306, vulnerability analysis engine 112 may transmit the groups to vulnerability remediation scheduling engine 113.

At step 307, vulnerability remediation scheduling engine 113 may receive the plurality of groups and may parse the vulnerabilities within each group. Vulnerability remediation scheduling engine 113 may identify each component of enterprise organization infrastructure 140 to be remediated as well as particular features of each component to be remediated. Vulnerability remediation scheduling engine 113 may retrieve, from vulnerability and remediation database 119, the data that describes each component of enterprise organization infrastructure 140 (e.g., the remediation history of each component, scheduled remediations for each component, remediation issues the components previously experienced, or the like).

At step 308, vulnerability remediation scheduling engine 113 may use the retrieved data and at least one data classification algorithm (e.g., a Random Forest Decision Classification algorithm, a logical regression algorithm, or the like) to identify a time frame (e.g., between 00:00 and 23:59, or the like) during which each component, and corresponding vulnerabilities, may be remediated. Vulnerability remediation scheduling engine 113 may generate a decision tree, wherein the root node may correspond to the component to be remediated and a first level of branches may correspond to vulnerabilities associated with the component. Subsequent levels of branches may correspond to potential time frames during which the vulnerability may be remediated. Vulnerability remediation scheduling engine 113 may continuously reduce the elected time frame to identify the time frame within which the vulnerability may be remediated.

At step 309, vulnerability remediation scheduling engine 113 may generate a remediation schedule based on the elected time frames. The remediation schedule may indicate each vulnerability to be remediated as well as the corresponding time frame within which each vulnerability may be remediated. Vulnerability remediation scheduling engine 113 may transmit the remediation schedule to cognitive engine 114.

At step 310, anomaly detection engine 115 may parse the remediation schedule to determine whether the remediation schedule comprises at least one anomaly. Anomaly detection engine 115 may determine a value associated with each vulnerability indicated on the remediation schedule. Anomaly detection engine 115 may plot the vulnerabilities (e.g., using the vulnerability scores, or the like). Anomaly detection engine 115 may identify at least one cluster of vulnerabilities, wherein the cluster indicates a location where a majority of vulnerabilities associated with a component may be gathered. Anomaly detection engine 115 may generate at least one boundary, wherein each boundary may surround an identified cluster of vulnerabilities. Anomaly detection engine 115 may determine that the vulnerabilities that are outside of the boundaries may be anomalies.

If, at step 310, anomaly detection engine 115 determines that the remediation schedule might not comprise anomalies (e.g., all vulnerabilities may be within a boundary, or the like), then, at step 311, remediation engine 117 may remediate the vulnerabilities (e.g., according to the remediation schedule, or the like). Communication engine 118 may monitor the remediation of each vulnerability indicated on the remediation schedule. Communication engine 118 may generate a notification indicating that vulnerabilities within enterprise organization infrastructure 140 were identified and remediated, and may transmit the notification to enterprise organization computing device 130.

Alternatively, if at step 310, anomaly detection engine 115 determines that the remediation schedule comprises at least one anomaly (e.g., at least one vulnerability is outside of the boundary surrounding the component with which the vulnerability is associated, or the like), then, at step 312, vulnerability remediation forecasting engine 116 may parse the anomaly and determine a corresponding anomaly score. Vulnerability remediation forecasting engine 116 may determine a distance between the anomaly and the boundary surrounding the component with which the vulnerability may be associated. Vulnerability remediation forecasting engine 116 may use at least one data classification algorithm (e.g., an XG Boosting algorithm, or the like) to apply a weighted value to the distance between the anomaly and the boundary to determine the anomaly score.

At step 313, vulnerability remediation forecasting engine 116 may compare each anomaly score to a threshold anomaly score (e.g., a maximum anomaly score that may indicate that remediation of the vulnerability might not interrupt the functionality of enterprise organization infrastructure 140, or the like).

If, at step 313, vulnerability remediation forecasting engine 116 determines that the anomaly score may be less than the threshold anomaly score, then, at step 314, vulnerability remediation forecasting engine 116 may determine that the vulnerability that corresponds to anomaly may be remediated. As such, remediation engine 117 may retrieve, from vulnerability and remediation engine 119, commands and/or software patches that may be used to remediate the anomalies. Remediation engine 117 may execute the identified commands and/or software patches to remediate the anomalies. Communication engine 118 may monitor the remediation of each anomaly and may generate a notification indicating that anomalies have been identified and remediated. Communication engine 118 may transmit the notification to enterprise organization computing device 130.

Alternatively, if, at step 313, vulnerability remediation forecasting engine 116 determines that the anomaly score may be equal to or greater than the threshold anomaly score, then, at step 315, vulnerability remediation forecasting engine 116 may predict the success of the remediation of the vulnerability that corresponds to the anomaly. To do so, vulnerability remediation forecasting engine 116 may use the at least one data classification algorithm and training data (e.g., previously analyzed anomalies and the corresponding vulnerabilities, previously determined anomaly scores, possible scenarios indicating the functionality of enterprise organization infrastructure 140 if the anomaly is remediated, possible scenarios indicating the functionality of enterprise organization infrastructure 140 if the anomaly is not remediated, or the like).

At step 316, vulnerability remediation forecasting engine 116 may determine whether the remediation of the anomaly is predicted to be successful.

If, at step 316, vulnerability remediation forecasting engine 116 predicts that the remediation of the vulnerability that corresponds to the anomaly may be successful, then, at step 317, vulnerability remediation forecasting engine 116 may indicate that the vulnerability associated with the anomaly may be remediated. Remediation engine 117 may parse remediation commands and/or software patches to identify at least one command and/or software patch that may remediate the anomaly. Remediation engine 117 may execute the identified commands and/or software patches to remediate the anomaly. Communication engine 118 may monitor the remediation of each anomaly and may generate a notification indicating that anomalies have been identified and remediated. Communication engine 118 may transmit the notification to enterprise organization computing device 130.

Alternatively, if at step 316, vulnerability remediation forecasting engine 116 predicts that the remediation of the vulnerability that corresponds to the anomaly may be unsuccessful, then, at step 318, vulnerability remediation forecasting engine 116 may indicate that the vulnerability associated with the anomaly might not be remediated. Communication engine 118 may generate a notification indicating that the vulnerability associated with the anomaly might not be remediated and may transmit the notification to enterprise organization computing device 130.

As a result, the proposed solution may provide the following benefits: 1) real-time, or near real-time, identification and analysis of vulnerabilities impacting an enterprise organization infrastructure; 2) real-time, or near real-time, remediation of the vulnerabilities using a cognitive engine, wherein the remediation may be based on predicting the success of each remediation; and 3) real-time, or near real-time, generation of a universal vulnerability remediation infrastructure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:

at a computing device including one or more processors and memory:

analyzing a plurality of components within an enterprise organization infrastructure;

identifying, based on the analysis, a plurality of vulnerabilities within the enterprise organization infrastructure, wherein each vulnerability corresponds to at least one component of the plurality of components, and wherein identifying the plurality of vulnerabilities includes, for each component of the plurality of components:

receive an expected functionality of a respective component;

observe the respective component to determine an actual functionality of the respective component;

determine whether the actual functionality of the respective component matches the expected functionality of the respective component, wherein the actual functionality not matching the expected functionality indicates a vulnerability of the respective component;

receiving at least one software patch comprising a remediation solution for at least one vulnerability associated with a component of the plurality of components;

identifying similarities shared by the plurality of vulnerabilities, wherein a similarity is identified between two or more vulnerabilities of the plurality of vulnerabilities based on the two or more vulnerabilities corresponding to a same component of the plurality of components;

grouping vulnerabilities, of the plurality of vulnerabilities, based on the identified similarities;

identifying, for each group, a time during which the vulnerabilities can be remediated;

generating a remediation schedule comprising the vulnerabilities and the times;

determining whether the remediation schedule comprises anomalies that would interrupt scheduled remediations of other vulnerabilities;

generate a graphical representation of the vulnerabilities, wherein generating the graphical representation includes plotting a distance of each vulnerability from the respective component;

generate a boundary surrounding a cluster of vulnerabilities; and based on determining that all vulnerabilities are within the boundary, remediating the vulnerabilities indicated in the remediation schedule at the time indicated by executing the software patch.

2. The method of claim 1, wherein the analyzing the enterprise organization infrastructure further comprises receiving a voice command comprising instructions to monitor the plurality of components.

3. The method of claim 2, further comprising:

parsing the voice command using at least one natural language processing (NLP) algorithm and at least one lexical analyzer;

mapping phrases from the parsed voice command to at least one component of the plurality of components;

determining whether at least one similar voice command was previously received; and based on determining a similar voice command was previously received, identifying a plurality of remediation commands used to remediate at least one vulnerability of the plurality of vulnerabilities.

4. The method of claim 3, further comprising, based on determining a similar voice command was not previously received, generating the plurality of remediation commands using the at least one software patch.

5. The method of claim 1, wherein the identifying the time during which the vulnerabilities can be remediated comprises:

identifying features that correspond to each component of the plurality of components;

determining, for each feature and using at least one data classification algorithm, a plurality of times during which the feature can be remedied; and identifying a time, of the plurality of times, during which a majority of the features associated with the component can be remedied.

6. The method of claim 1, further comprising, based on determining that at least one vulnerability is outside the boundary, determining an anomaly score for the vulnerability outside the boundary, wherein the determining the anomaly score comprises:

mapping, for each group, the vulnerabilities within the group;

identifying, using at least one machine learning algorithm, at least one anomaly, wherein the anomaly is located outside of the boundary;

determining, for each anomaly, a distance from the boundary; and assigning a weight to each distance.

7. The method of claim 6, further comprising comparing the anomaly score to a threshold anomaly score.

8. The method of claim 7, further comprising, based on determining the anomaly score is less than the threshold anomaly score, remediating a corresponding vulnerability.

9. The method of claim 7, further comprising, based on determining the anomaly score is greater than the threshold anomaly score, predicting whether remediation of the corresponding vulnerability is successful.

10. The method of claim 9, further comprising:

based on predicting the remediation is successful, remediating the corresponding vulnerability; or based on predicting the remediation is unsuccessful, removing the corresponding vulnerability from the remediation schedule.

11. A computing platform comprising:

at least one processor;

a communication interface communicatively coupled to the at least one processor; and memory storing computer-readable instructions that, when executed by the at least one processor, cause the computing platform to:

analyze a plurality of components within an enterprise organization infrastructure;

identify, based on the analysis, a plurality of vulnerabilities within the enterprise organization infrastructure, wherein each vulnerability corresponds to at least one component of the plurality of components, and wherein identifying the plurality of vulnerabilities includes, for each component of the plurality of components:

receive an expected functionality of a respective component;

observe the respective component to determine an actual functionality of the respective component;

determine whether the actual functionality of the respective component matches the expected functionality of the respective component, wherein the actual functionality not matching the expected functionality indicates a vulnerability of the respective component;

receive at least one software patch comprising a remediation solution for at least one vulnerability associated with a component of the plurality of components;

identify similarities shared by the plurality of vulnerabilities, wherein a similarity is identified between two or more vulnerabilities of the plurality of vulnerabilities based on the two or more vulnerabilities corresponding to a same component of the plurality of components;

group vulnerabilities, of the plurality of vulnerabilities, based on the identified similarities;

identify, for each group, a time during which the vulnerabilities can be remediated;

generate a remediation schedule comprising the vulnerabilities and the times;

determine whether the remediation schedule comprises anomalies that would interrupt scheduled remediations of other vulnerabilities;

generate a graphical representation of the vulnerabilities, wherein generating the graphical representation includes plotting a distance of each vulnerability from the respective component;

generate a boundary surrounding a cluster of vulnerabilities; and based on determining that all vulnerabilities are within the boundary, remediate the vulnerabilities indicated in the remediation schedule at the time indicated by executing the software patch.

12. The computing platform of claim 11, wherein the analyzing the enterprise organization infrastructure further comprises receiving a voice command comprising instructions to monitor the plurality of components.

13. The computing platform of claim 11, wherein the instructions, when executed, further cause the computing platform to, based on determining that at least one vulnerability is outside the boundary, determine an anomaly score for the vulnerability outside the boundary, wherein the determining the anomaly score further causes the computing platform to:

map, for each group, the vulnerabilities within the group;

identify, using at least one machine learning algorithm, at least one anomaly, wherein the anomaly is located outside of the boundary;

determine, for each anomaly, a distance from the boundary; and assign a weight to each distance.

14. The computing platform of claim 13, further comprising, comparing the anomaly score to a threshold anomaly score.

15. One or more non-transitory computer-readable media storing instructions that, when executed by a computing platform comprising at least one processor, memory, and a communication interface, cause the computing platform to:

analyze a plurality of components within an enterprise organization infrastructure;

identify, based on the analysis, a plurality of vulnerabilities within the enterprise organization infrastructure, wherein each vulnerability corresponds to at least one component of the plurality of components, and wherein identifying the plurality of vulnerabilities includes, for each component of the plurality of components:

receive an expected functionality of a respective component;

observe the respective component to determine an actual functionality of the respective component;

determine whether the actual functionality of the respective component matches the expected functionality of the respective component, wherein the actual functionality not matching the expected functionality indicates a vulnerability of the respective component;

receive at least one software patch comprising a remediation solution for at least one vulnerability associated with a component of the plurality of components;

identify similarities shared by the plurality of vulnerabilities, wherein a similarity is identified between two or more vulnerabilities of the plurality of vulnerabilities based on the two or more vulnerabilities corresponding to a same component of the plurality of components;

group vulnerabilities, of the plurality of vulnerabilities, based on the identified similarities;

identify, for each group, a time during which the vulnerabilities can be remediated;

generate a remediation schedule comprising the vulnerabilities and the times;

determine whether the remediation schedule comprises anomalies that would interrupt scheduled remediations of other vulnerabilities;

generate a graphical representation of the vulnerabilities, wherein generating the graphical representation includes plotting a distance of each vulnerability from the respective component;

generate a boundary surrounding a cluster of vulnerabilities; and based on determining that all vulnerabilities are within the boundary, remediate the vulnerabilities indicated in the remediation schedule at the time indicated by executing the software patch.

16. The non-transitory computer-readable media of claim 15, wherein the analyzing the enterprise organization infrastructure further comprises receiving a voice command comprising instructions to monitor the plurality of components.

17. The non-transitory computer-readable media of claim 16, wherein the receiving the voice command further causes the computing platform to:

parse the voice command using at least one natural language processing (NLP) algorithm and at least one lexical analyzer;

map phrases from the parsed voice command to at least one component of the plurality of components;

determine whether at least one similar voice command was previously received; and based on determining a similar voice command was previously received, identify a plurality of remediation commands used to remedy at least one vulnerability of the plurality of vulnerabilities.

* * * * *